United States Patent
Veenman et al.

(10) Patent No.: US 10,627,597 B2
(45) Date of Patent: Apr. 21, 2020

(54) METHOD OF COOLING FULL DISPLAY MIRROR

(71) Applicant: Gentex Corporation, Zeeland, MI (US)

(72) Inventors: Steven J. Veenman, Hudsonville, MI (US); Dennis D. Festerling, Jr., Allegan, MI (US); Jason D. Hallack, Allendale, MI (US); Danny L. Minikey, Jr., Fenwick, MI (US); Keith H. Berends, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/693,988

(22) Filed: Sep. 1, 2017

(65) Prior Publication Data

US 2018/0067279 A1     Mar. 8, 2018

Related U.S. Application Data

(60) Provisional application No. 62/383,066, filed on Sep. 2, 2016.

(51) Int. Cl.

| | |
|---|---|
| *F21V 29/67* | (2015.01) |
| *G02B 7/18* | (2006.01) |
| *B60R 1/12* | (2006.01) |
| *F21V 29/508* | (2015.01) |
| *B60R 1/04* | (2006.01) |
| *F21V 29/61* | (2015.01) |
| *F21V 29/63* | (2015.01) |
| *F21Y 115/10* | (2016.01) |

(52) U.S. Cl.
CPC .............. *G02B 7/1815* (2013.01); *B60R 1/04* (2013.01); *B60R 1/12* (2013.01); *F21V 29/508* (2015.01); *F21V 29/61* (2015.01); *F21V 29/63* (2015.01); *F21V 29/673* (2015.01); *B60R 2001/1215* (2013.01); *B60R 2001/1253* (2013.01); *F21Y 2115/10* (2016.08)

(58) Field of Classification Search
CPC .... B60R 1/02; B60R 1/04; B60R 1/12; B60R 1/1207; B60R 2001/1215; B60R 2001/1253; B60R 2300/207; B60R 13/0884; F21V 29/502; F21V 29/508; F21V 29/61; F21V 29/67; F21V 29/673
USPC ........................................ 362/494, 547, 549
See application file for complete search history.

(56) References Cited

U.S. PATENT DOCUMENTS

| | | | |
|---|---|---|---|
| 4,320,937 A | * | 3/1982 | Schuwerk ............. B60R 1/0602 359/508 |
| 5,398,041 A | | 3/1995 | Hyatt |

(Continued)

FOREIGN PATENT DOCUMENTS

| | | |
|---|---|---|
| CN | 205044633 U | 2/2016 |
| EP | 1122990 A2 | 8/2001 |

(Continued)

*Primary Examiner* — Suezu Ellis
(74) *Attorney, Agent, or Firm* — Price Heneveld LLP; Bradley D. Johnson

(57) ABSTRACT

A rearview assembly for a vehicle includes a rearview device and a processor. A housing supports the rearview device and the processor. The housing defines a recess therein. An air moving device is operably coupled with the housing and is configured to draw air from an area exterior to the housing into the recess, thereby cooling at least one of the rearview device and the processor.

20 Claims, 5 Drawing Sheets

(56) References Cited

U.S. PATENT DOCUMENTS

| | | | | |
|---|---|---|---|---|
| 5,638,895 | A * | 6/1997 | Dodson | H01L 23/467 |
| | | | | 165/121 |
| 5,719,714 | A * | 2/1998 | Ackeret | B60R 1/12 |
| | | | | 351/158 |
| 6,201,471 | B1 * | 3/2001 | Jones | B60H 1/00985 |
| | | | | 340/461 |
| 7,397,461 | B1 * | 7/2008 | Graham | G06F 1/20 |
| | | | | 345/156 |
| 8,106,567 | B2 | 1/2012 | Eichhorner et al. | |
| 9,019,090 | B2 | 4/2015 | Weller et al. | |
| 2004/0253130 | A1 * | 12/2004 | Sauciuc | F04D 33/00 |
| | | | | 417/436 |
| 2006/0061008 | A1 | 3/2006 | Karner et al. | |
| 2009/0201137 | A1 * | 8/2009 | Weller | B60R 1/12 |
| | | | | 340/425.5 |
| 2010/0080399 | A1 * | 4/2010 | Pfau | B60H 1/00764 |
| | | | | 381/71.4 |
| 2014/0017075 | A1 * | 1/2014 | Wu | F04D 29/056 |
| | | | | 415/203 |
| 2014/0169017 | A1 * | 6/2014 | Song | B60Q 1/2607 |
| | | | | 362/511 |
| 2018/0251069 | A1 * | 9/2018 | Lacross | B60R 1/12 |

FOREIGN PATENT DOCUMENTS

| | | |
|---|---|---|
| JP | 2001213243 A | 8/2001 |
| JP | 2009081270 A | 4/2009 |

\* cited by examiner

METHOD OF COOLING FULL DISPLAY MIRROR

CROSS-REFERENCE TO RELATED APPLICATION

This application claims priority to and the benefit under 35 U.S.C. § 119(e) of U.S. Provisional Patent Application No. 62/383,066, filed on Sep. 2, 2016, entitled "METHOD OF COOLING FULL DISPLAY MIRROR," the disclosure of which is hereby incorporated herein by reference in its entirety.

FIELD OF THE DISCLOSURE

The present disclosure generally relates to a display mirror, and more particularly to a method of cooling a full display mirror.

SUMMARY OF THE DISCLOSURE

According to one aspect of the present disclosure, a rearview assembly for a vehicle includes a rearview device and a processor. A housing supports the rearview device and the processor. The housing defines a recess therein. An air moving device is operably coupled with the housing and is configured to draw air from an area exterior to the housing into the recess, thereby cooling at least one of the rearview device and the processor.

According to another aspect of the present disclosure, a rearview assembly includes a rearview device, a processor, and a light-emitting diode (LED) board. A housing supports the rearview device, the processor, and the LED board. An air moving device is operably coupled with the housing and is configured to draw air from an area exterior to the housing to a radiator configured to cool the processor and LED board.

According to yet another aspect of the present disclosure, a rearview assembly includes a rearview device. A housing supports the rearview device. The housing defines a recess therein. A blower is disposed within the housing and is operable to draw air from an area exterior to the housing into the recess proximate the rearview device.

These and other features, advantages, and objects of the present disclosure will be further understood and appreciated by those skilled in the art by reference to the following specification, claims, and appended drawings.

DETAILED DESCRIPTION

Figure 1:
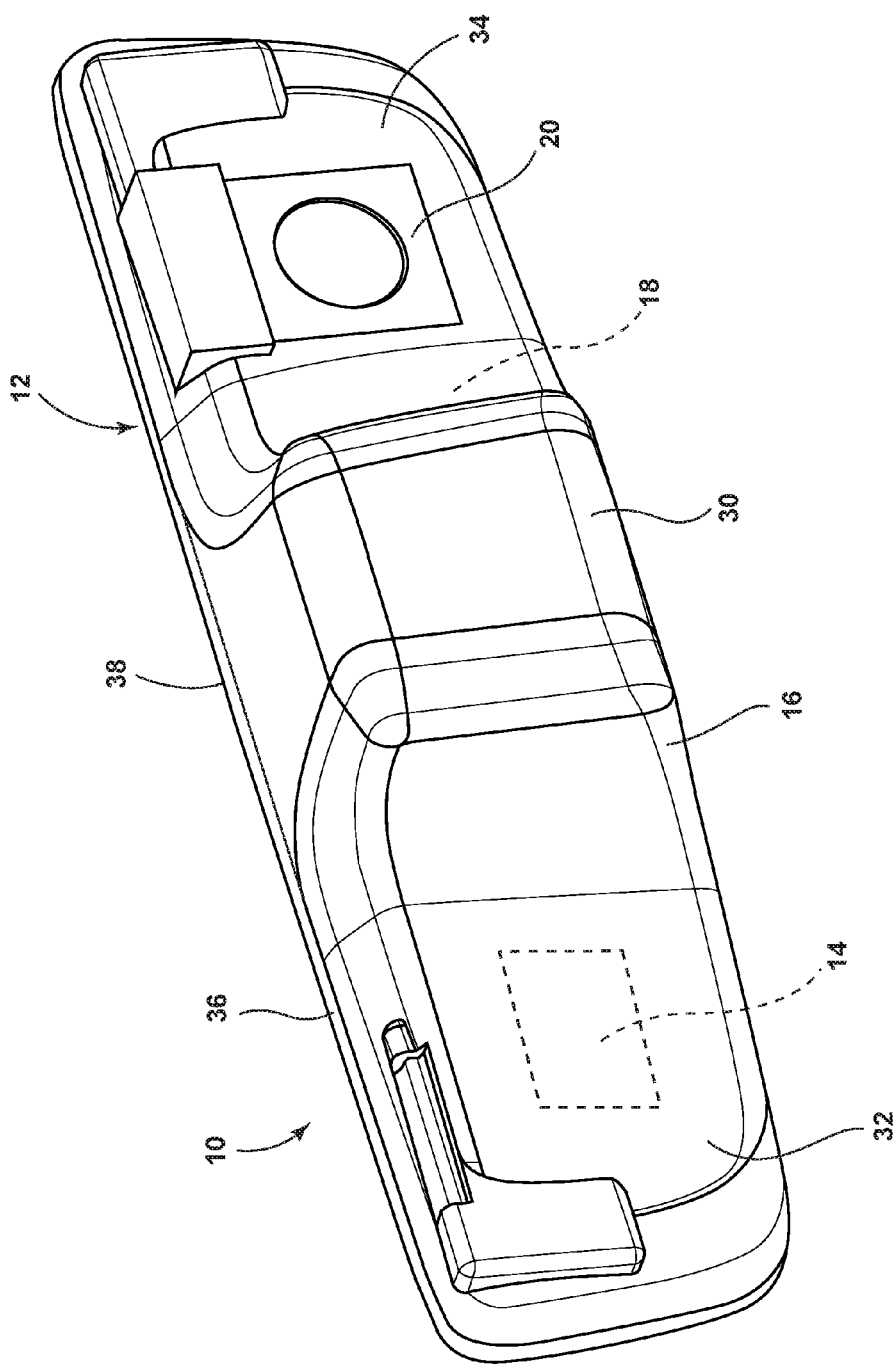
FIG. 1 is a rear perspective view of a rearview assembly of the present disclosure.

The present illustrated embodiments reside primarily in combinations of method steps and apparatus components related to a display mirror. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-5, reference numeral 10 generally designates a rearview assembly for a vehicle. The rearview assembly 10 includes a rearview device 12 and a processor 14. A housing 16 supports the rearview device 12 and the processor 14. The housing 16 defines a recess 18 therein. An air moving device 20 is operably coupled with the housing 16 and is configured to draw air from an area exterior to the housing 16 into the recess 18, thereby cooling at least one of the rearview device 12 and the processor 14. An LED board may be cooled by the air moving device 20.

With reference again to FIG. 1, the rearview assembly 10 is generally configured for use inside a vehicle. The rearview assembly 10 may be operably coupled with an inside surface of a windshield, a headliner of the vehicle, operably coupled with a dash of the vehicle, or directly coupled with a support structure or frame of the vehicle. The housing 16 includes a central rearwardly-extending protrusion 30 (FIG. 2) configured to engage a mount that couples the rearview assembly 10 with the vehicle. Each side 32, 34 of the rearview assembly 10 includes a slimmer profile configured for grasping by a passenger. In the illustrated embodiment, the rearview assembly 10 includes a bezel 36 forward of the housing 16 configured to provide an interface between the housing 16 and a display 38 of the rearview assembly 10, electro-optic device, or mirror device of the rearview assembly 10.

Figure 2:
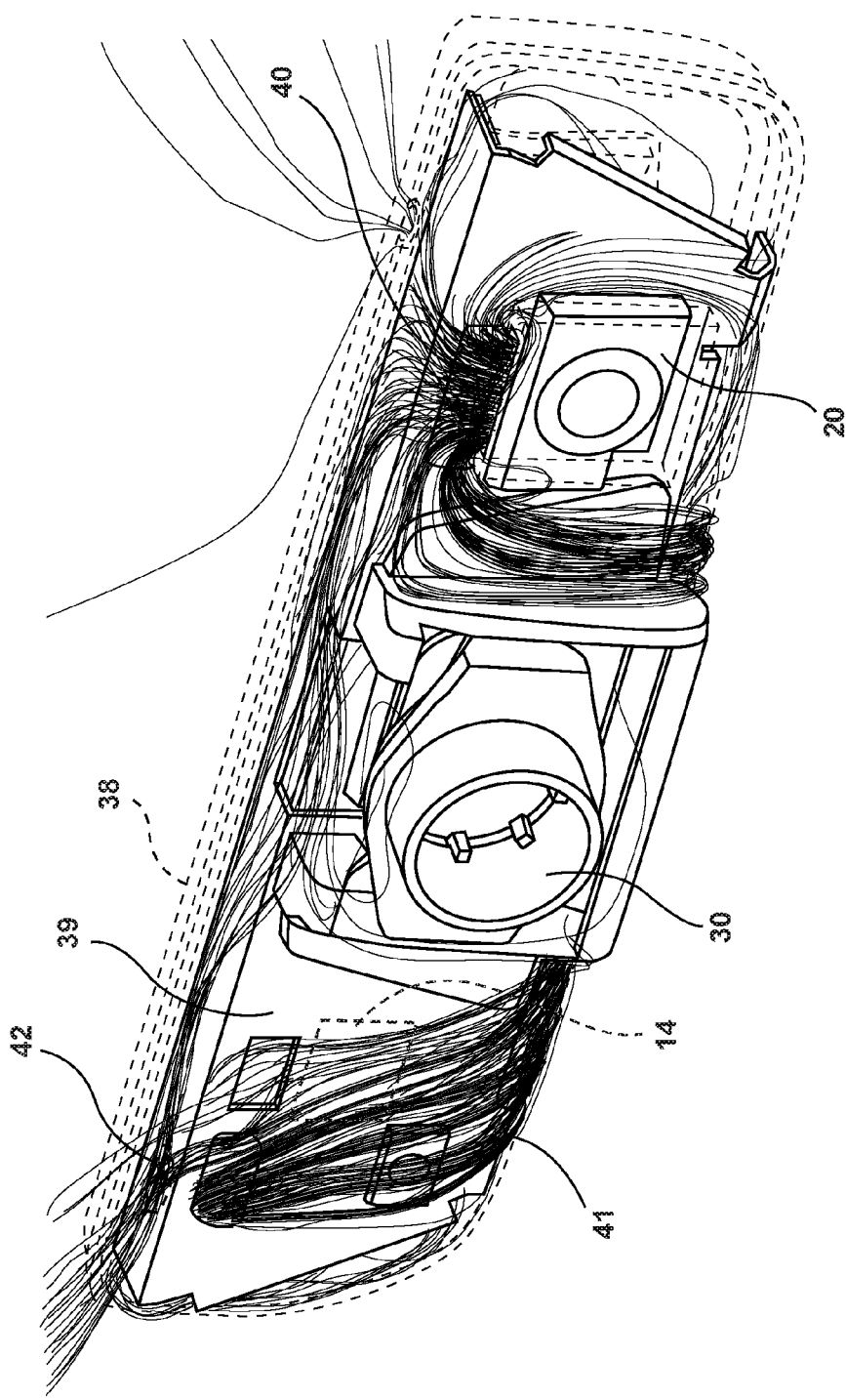
FIG. 2 is a rear perspective view of a rearview assembly of the present disclosure with the housing shown in phantom and also showing air flow lines through the rearview assembly.
Figure 3:
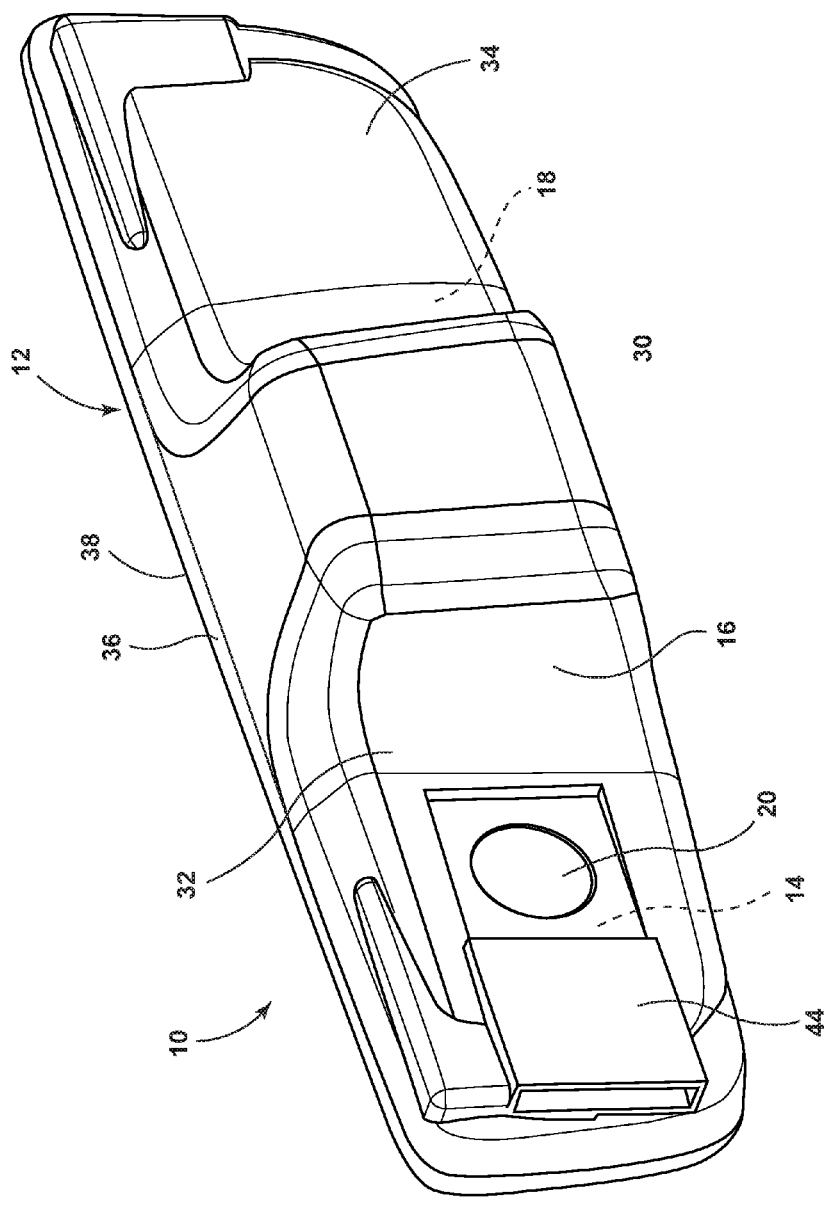
FIG. 3 is a rear perspective view of another rearview assembly of the present disclosure.

With reference again to FIG. 1, the illustrated rearview assembly 10 includes the processor 14, which is in electrical communication with electrical components of the rearview assembly 10 and supported on a carrier plate 39. The processor 14 can generate excessive heat that can impact the overall performance of the rearview assembly 10 and negatively effect longevity of the rearview assembly 10 as a whole. Accordingly, heat management proximate the processor 14 can increase the lifespan of the rearview assembly 10 and increase performance of the rearview assembly 10. In the illustrated embodiment, the recess 18 generally defines an air pathway through the housing 16 that is in fluid communication with the interior recess 18 of the housing 16. The air pathway allows for heat that is generated within the housing 16 to escape to the environment. In an effort to maximize thermal cooling of the processor 14, the processor 14 may be positioned at a first end of the recess 18, and the air moving device 20 may be positioned at a second end of the recess 18. Alternatively, the air moving device 20 may be directly adjacent to the processor 14 (FIG. 3). The air moving device 20 is generally configured to move air by the processor 14, thereby cooling the processor 14 during operation. It is generally contemplated that the air moving device 20 can blow air by the processor 14 or draw air by the air moving device 20. In either instance, cooling of the processor 14 is achieved. FIG. 2 illustrates one embodiment of the rearview assembly 10 utilizing the air moving device 20, which causes movement of air through the recess 18 of the housing 16 (illustrated by air flow lines 41). As shown, the air moving device 20 draws air through a first port 40 and blows the cool air past the processor 14, and cools the processor 14 by pushing warmed air proximate to the processor 14 out a second port 42. The process could also work in reverse. The air moving device 20 could draw warm air from the processor 14 inside the housing 16, and blow the warmed air out an exhaust port. Alternatively, defined ports may not be present at all. In this instance, the air moving device 20 could draw cool air from the surrounding environment and blow the air past the processor 14, thus cooling the processor 14. The heat would exit through joints in the rearview assembly 10 as the rearview assembly 10 is not airtight.

With reference now to FIG. 3, the illustrated embodiment includes an air moving device 20 that is proximate the processor 14 of the rearview assembly 10. The air moving device 20 draws air or blows air from the processor 14 out a duct 44, thereby removing heat from the area proximate the processor 14. Notably, in this instance, air is not blown through the recess 18 of the housing 16. Rather, the air moving device 20 simply removes heat from the processor 14 directly outward to the environment.

Figure 4:
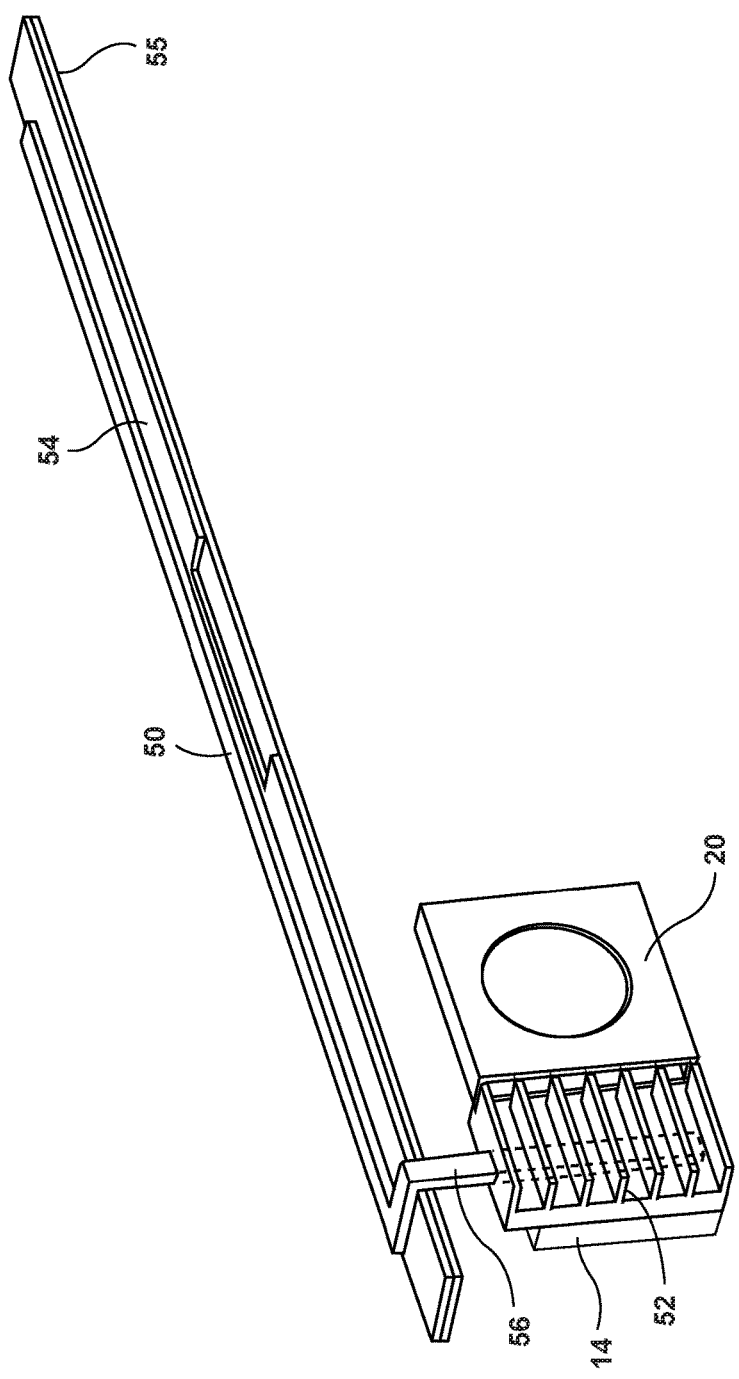
FIG. 4 is a top perspective view of a cooling system of the present disclosure.

With reference now to FIG. 4, in the illustrated embodiment, the rearview assembly 10 includes a heat pipe 50, a radiator 52, and a cooling plate 54. The radiator 52 is operably coupled with the air moving device 20. The processor 14 is thermally coupled to the radiator 52 so that heat can be removed by the air moving device 20. The air moving device 20 removes heat from the radiator 52 by blowing air past the radiator 52, which radiates the heat externally to the environment.

With reference again to FIG. 4, the air moving device 20 is proximate both the radiator 52 and the heat pipe 50. The heat pipe 50 acts as a heat transfer device, utilizing thermal conductivity to efficiently manage the transfer of heat away from a light-emitting diode (LED) board 55. The heat pipe 50 includes a working fluid disposed therein. The working fluid is configured to move between liquid and gaseous states within the heat pipe 50. Heat from the LED board 55 is transferred into the cooling plate 54 and then into the heat pipe 50. The heat works to vaporize the working fluid, which travels to a cool end 56 of the heat pipe 50 proximate the radiator 52. At the same time, heat from the processor 14 is transferred to the radiator 52. Cool air that is drawn in from the environment by the air moving device 20 is then forced across the radiator 52, which cools the processor 14 and the working fluid vapor in the heat pipe 50. As the vapor in the heat pipe 50 cools back into a liquid, the liquid is wicked back to the hot areas of the heat pipe 50 adjacent to the LED board 55 and the process begins again. As a result, the working fluid is continually moving heat from the LED board 55 to the cooling plate 54 and then to the radiator 52, thus lessening the thermal load.

Figure 5:
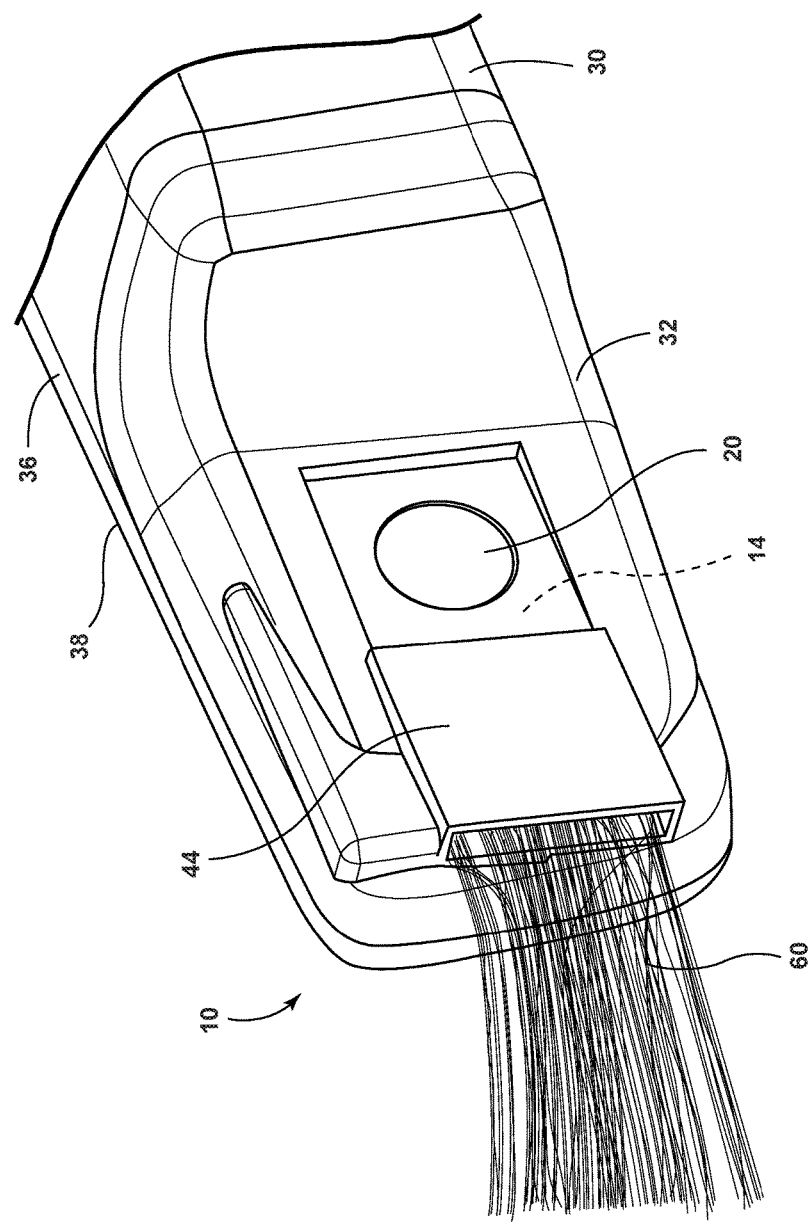
FIG. 5 is an enlarged partial rear perspective view of an air moving device with air flow lines in a rearview assembly of the present disclosure.

FIG. 5 generally illustrates the direction of air flow lines 60 of the embodiment of FIG. 3 after heated air has been blown away (or drawn away) from the processor 14 past the radiator 52 by the air moving device 20. Although the heated air is illustrated as moving through the duct 44 in a longitudinal direction relative to the longitudinal extent of the rearview assembly 10, it is also contemplated that the heated air may be blown upward or downward relative to the rearview assembly 10.

The cooling system as set forth herein is configured to prevent overheating of a rearview assembly having a full display mirror or other electronic features, thereby increasing performance and longevity of the rearview assembly. In addition, external surfaces of the rearview assembly are maintained at a comfortable temperature such that a passenger can easily grasp the external surfaces and adjust the rearview assembly. The air moving device 20, as set forth herein, may be a fan, a blower, a piezoelectric blower, a solid state ionic air mover, etc., that provides cooling and maintains ideal temperature thresholds. It will be understood that more than an air moving device (one or more fans, one or more blowers, etc.) may be utilized in conjunction with one or more heat pipes to provide external and internal device temperatures that meet customer desirabilities and working limits of the electronics of the rearview assembly. It will also be understood that the speed of the air moving device can be activated and deactivated, and also variably modulated based on the desired cooling load.

In addition, an air moving device having a speed modulating control can be utilized to reduce the relative noise level of the rearview assembly. This feature may be desirable because the rearview assembly is located adjacent to and between the driver and passenger. The speed, and therefore the volumetric flow rate and noise output, of the air moving device can be reduced temporarily as the ambient noise level in the vehicle cabin is lowered. These are typically instances when the vehicle is traveling below a threshold speed, for example, entering or leaving a parking ramp, coming to a stop, slowing down, etc. However, other scenarios are also possible. For example, a noise output associated with a particular measure of revolutions per minute (RPM) can be adjusted based on the operation of a heating, ventilation, and cooling (HVAC) system within the vehicle, an audio system within the vehicle, or whether the windows are open or to what degree the windows are open. The processor 14 within the rearview assembly 10 determines whether a predetermined noise output associated with the windows down (as an example) satisfies a threshold noise output requirement. If so, the air moving device 20 is activated to cool the rearview assembly 10. If not, the air moving device 20 may be deactivated or activated at a reduced RPM. The same process can be initiated when the audio system is activated, the HVAC system is activated, or ambient noise levels are detected that allow for the air moving device 20 to work at a higher RPM. The overall thermal mass of the system is generally sufficient to allow temporary reductions in the cooling performance. Once the vehicle begins traveling at a higher rate of speed, the speed modulating control may be operable to change an RPM of the air moving device 20, thereby changing the noise output of the air moving device 20 based on a vehicle speed. It is contemplated that the speed modulating control may be operable to reduce an overall volumetric flow rate or reduce the RPM of the air moving device 20, thereby reducing the noise output when the vehicle is moving below a threshold speed. Alternatively, it is contemplated that the speed modulating control may be operable to increase an overall volumetric flow rate or increase the RPM of the air moving device 20, thereby increasing the noise output when the vehicle is moving above a threshold speed. The speed modulating control may also operable to change an RPM of the air moving device 20, thereby changing the noise output of the air moving device 20 based on various different inputs. For example, the speed modulating control may be operable to change the RPM of the air moving device 20 based on at least one of an HVAC blower RPM and a radio volume level. Alternatively, the system can be set to monitor motor RPM, vehicle speed, etc., and when below a predetermined threshold, the LED board 55 could dim the LEDs, thereby lessening thermal output of the LED board 55. It is generally contemplated that the LED board 55 could be configured to dim when the fan cannot control or maintain a desired operating temperature. It will be understood that the LED board 55 could include a direct LED backlight of the display 38 and/or an edge lit LED backlight, as illustrated in FIG. 4.

Moreover, the air moving device 20 can also be controlled or modulated with direct ambient noise measurements from within the cabin via a microphone and processor. Alternatively, noise measurements can be predicted by detecting varying light levels from ambient and glare sensors that suggest vehicle movement, or via image processing from the vehicle cameras to detect movement (optical flow) and for speed and relative cabin noise. Additionally, the speed of the air moving device 20 can be modulated based on the speed of the vehicle itself, motor RPM, or other signals transmitted over the vehicle bus communications, or by discrete signal. The air moving device 20 can be slowed down when the vehicle is not moving, or moving at relatively slow speeds that do not meet a threshold requirement. The RPMs of the air moving device 20 may be adjusted linearly over a given range, or may be increased or decreased in a step-like controlled manner between a "fast speed" and a "low speed." When the speed exceeds those threshold requirements, the air moving device 20 can increase in speed as a result of an increase in ambient noise with the vehicle moving faster in speed.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly for a vehicle, the rearview assembly comprising:
    a rearview device;
    a processor;
    a housing supporting the rearview device and processor, the housing defining a recess therein;
    an air moving device operably coupled with the housing and configured to draw cool air from an area exterior to the housing into the recess past a radiator with fins, the radiator being in thermal communication with a heat sink adjacent at least one of the rearview device and the processor.

2. The rearview assembly of claim 1, further comprising:
    a light-emitting diode (LED) board that is cooled by the air moving device.

3. The rearview assembly of claim 1, wherein the air moving device includes multiple fans.

4. The rearview assembly of claim 1, wherein the air moving device includes at least one piezoelectric blower.

5. The rearview assembly of claim 1, further comprising:
    a heat pipe disposed proximate the air moving device.

6. The rearview assembly of claim 1, further comprising:
a speed modulating control configured to reduce a speed of the air moving device and reduce a related noise output associated with the speed of the air moving device.

7. The rearview assembly of claim 6, wherein the speed modulating control is configured to receive data associated with a vehicle speed and is operable to change revolutions per minute (RPM) of the air moving device, thereby changing the noise output of the air moving device based on the vehicle speed.

8. The rearview assembly of claim 6, wherein the speed modulating control is configured to receive data associated with a revolutions per minute (RPM) of a motor of a vehicle and is operable to reduce the volumetric flow rate of the air moving device, thereby reducing the speed modulating control noise output when the motor of the vehicle is operating below a threshold RPM.

9. The rearview assembly of claim 6, wherein the speed modulating control is operable to change revolutions per minute (RPM) of the air moving device, thereby changing the noise output of the air moving device based on at least one of:
a heating, ventilation, and cooling (HVAC) blower RPM; and
a radio volume level.

10. A rearview assembly comprising:
a rearview device;
a processor;
a light-emitting diode (LED) board;
a housing supporting the rearview device, the processor, and the LED board; and
an air moving device operably coupled with the housing and configured to draw cool air from an area exterior to the housing to a radiator, wherein the processor and the LED board are cooled by a heat sink in thermal communication with the radiator and the air moving device.

11. The rearview assembly of claim 10, wherein the air moving device moves air through the housing.

12. The rearview assembly of claim 10, wherein the air moving device includes multiple fans.

13. The rearview assembly of claim 10, wherein the air moving device includes at least one piezoelectric blower.

14. The rearview assembly of claim 10, further comprising:
a heat pipe disposed proximate the air moving device.

15. The rearview assembly of claim 10, further comprising:
a speed modulating control configured to reduce a speed of the air moving device and reduce related noise associated with the speed of the air moving device.

16. The rearview assembly of claim 15, wherein the speed modulating control is configured to receive data associated with a vehicle speed and is operable to change revolutions per minute (RPM)of the air moving device, thereby changing the noise output of the air moving device based on the vehicle speed.

17. The rearview assembly of claim 15, wherein the speed modulating control is configured to receive data associated with a revolutions per minute (RPM) of a motor of a vehicle and is operable to reduce a volumetric flow rate of the air moving device, thereby reducing the speed modulating control noise output when the motor of the vehicle is operating below a threshold RPM.

18. The rearview assembly of claim 15, wherein the speed modulating control is operable to change revolutions per minute (RPM) of the air moving device, thereby changing the noise output of the air moving device based on at least one of:
a heating, ventilation, and cooling (HVAC) blower RPM; and
a radio volume level.

19. A rearview assembly comprising:
a rearview device;
a housing supporting the rearview device, the housing defining a recess therein; and
a blower disposed within the housing and operably coupled with a radiator that is in thermal communication with a heat pipe that draws heat from an interior of the housing, the blower being operable to draw air from an area exterior to the housing into the recess proximate the rearview device.

20. The rearview assembly of claim 19, further comprising:
a speed modulating control configured to reduce a speed of the blower and reduce related noise associated with the speed of the blower.

* * * * *